United States Patent
Ghanimi

(10) Patent No.: US 11,052,626 B2
(45) Date of Patent: Jul. 6, 2021

(54) SCREW PRESS

(71) Applicant: Andritz AG, Graz (AT)

(72) Inventor: Yassar Ghanimi, Hausmannstätten (AT)

(73) Assignee: ANDRITZ AG, Graz (AT)

( * ) Notice: Subject to any disclaimer, the term of this patent is extended or adjusted under 35 U.S.C. 154(b) by 378 days.

(21) Appl. No.: 16/319,059

(22) PCT Filed: May 23, 2017

(86) PCT No.: PCT/EP2017/062319
§ 371 (c)(1),
(2) Date: Jan. 18, 2019

(87) PCT Pub. No.: WO2018/019444
PCT Pub. Date: Feb. 1, 2018

(65) Prior Publication Data
US 2021/0122128 A1 Apr. 29, 2021

(30) Foreign Application Priority Data
Jul. 29, 2016 (AT) .............................. A 50694/2016

(51) Int. Cl.
*B30B 9/12* (2006.01)
*B30B 9/14* (2006.01)

(52) U.S. Cl.
CPC ................ *B30B 9/121* (2013.01); *B30B 9/14* (2013.01)

(58) Field of Classification Search
CPC ........... B30B 9/12; B30B 9/121; B30B 9/122; B30B 9/127; B30B 9/128; B30B 9/14; B30B 11/24; B30B 11/246; B30B 11/248
See application file for complete search history.

(56) References Cited

U.S. PATENT DOCUMENTS

| | | |
|---|---|---|
| 4,528,098 A | 7/1985 | Treyssac et al. |
| 8,191,470 B2 * | 6/2012 | Magor ............... B30B 9/121 100/117 |

(Continued)

FOREIGN PATENT DOCUMENTS

| | | |
|---|---|---|
| CN | 204916997 U | 12/2015 |
| DE | 266077 C | 11/1912 |

(Continued)

OTHER PUBLICATIONS

International Preliminary Report on Patentability dated Jul. 23, 2018 for International Patent Application No. PCT/EP2017/062319.

(Continued)

*Primary Examiner* — Matthew Katcoff
(74) *Attorney, Agent, or Firm* — Alix, Yale & Ristas, LLP

(57) ABSTRACT

A screw press for separating off liquid from an article, comprising a screw shaft together with a conveying helix, which is arranged helically on the screw shaft, and a housing enclosure, which surrounds the conveying helix, wherein a transporting passage for the article which is to be conveyed is formed between the screw shaft, the conveying helix and the housing enclosure, wherein a composite comprising hard-material particles which are embedded in a matrix component to form surface roughness is fastened with material bonding to at least one surface portion of the screw shaft, within the transporting passage. A use of a composite comprising hard-material particles which are embedded in a uniformly distributed manner in a matrix component to form surface roughness, for the purpose of providing fastening with material bonding to at least one surface portion of a screw shaft.

20 Claims, 1 Drawing Sheet

(56) References Cited

U.S. PATENT DOCUMENTS 10,087,990 B2 * 10/2018 von Schleinitz ........ F16C 35/06
2009/0162470 A1 * 6/2009 Schnabl ................ B29C 48/509
　　　　　　　　　　　　　　　　　　　　　425/209

FOREIGN PATENT DOCUMENTS

| DE | 4408717 A1 | 9/1995 |
| DE | 202016001466 U1 | 3/2016 |
| EP | 2848824 B1 | 6/2017 |
| JP | 2006198540 A | 8/2006 |
| KR | 101049965 B1 | 7/2011 |

OTHER PUBLICATIONS

International Search Report dated Sep. 18, 2017 for International Patent Application No. PCT/EP2017/062319.

* cited by examiner

SCREW PRESS

BACKGROUND

The invention relates to a screw press for removing liquid from a material to be conveyed, comprising a screw shaft complete with a spiral-shaped conveying flight mounted on the screw shaft and a housing shell surrounding it, where a transport channel is formed for the material to be conveyed between the screw shaft, the conveying flight, and the housing shell. In addition, the use of a composite material is stated in the context of the invention in connection with a screw press.

The conveying material to be processed by the screw press is usually a solid-liquid mixture, for example industrially produced chemical pulp fibers, from which the liquid carried along with the fibrous material is to be removed by pressing. Similarly, the conveying material to be compacted by the screw press can be pulp or sludge suspensions, waste paper, sawdust, or waste wood, for example.

The principle of a screw press is sufficiently well known. A screw shaft fitted with a spiral-shaped conveying flight is mounted on bearings inside a cylindrical or conical housing shell. The housing shell has an inlet port, usually with a filling funnel, through which the material to be conveyed is fed to the screw press continuously. In the downstream conveying direction of the material, the housing shell has an outlet port through which the material to be conveyed leaves the screw press. Between the housing shell and the screw shaft or conveying flight, a spiral-shaped or helical transport channel is developed, which forms a continuous transport channel for the material to be conveyed from the inlet port to the outlet port and narrows constantly in conveying direction towards the outlet port. There may also be several helical transport channels.

As soon as the screw shaft is set in rotation, material to be conveyed that is fed into the screw press through the inlet port is conveyed along the turns of the transport channel to the outlet port by the conveying flight mounted on the screw shaft and is compacted and squeezed continuously during this process. Conveying and pressure build-up in single-screw and synchronized twin screw presses are effected by the friction generated by the mass rotating together with the screw and the stationary cylindrical housing shell—this is referred to in this context as friction conveying. Liquid that is removed from the material to be conveyed during the pressing process reaches a collecting container through the corresponding liquid passages in the housing shell—for example slot-shaped or perforated liquid passages.

The function of a screw press is determined by the conveying screw, that is to say the screw shaft together with the spiral-shaped screw flight attached to it, which at the same time generates the pressure build-up for the conveying material to be pressed.

The problematical aspect of generic screw presses is that the screw shaft is exposed to severe abrasion from the conveying material transported in the transport channel of the screw shaft, which is why the surface of the screw shaft is polished smooth after a certain period in operation—depending on the degree of abrasion from the respective material to be conveyed. Nevertheless, there is still the disadvantage of certain conveying materials, for example chemical pulp fibers or fiber stock suspensions adhering or sticking to the smoothly polished surface of the screw shaft. The chemical pulp fibers rotate together with the smoothly polished surface of the screw shaft in an undesirable way faster than was the case previously on a rough shaft surface.

As a result of this co-rotation of the chemical pulp fibers on the screw shaft surface, the efficiency of the screw press is reduced. Furthermore, conveying material adhering to the screw shaft can result in the transport channel being filled unevenly and may even cause clogging of the press. In order to mitigate this problem, materials with a defined surface roughness are applied to the surface of the screw shaft in order to ensure less adherence by the pulp suspension and thus greater efficiency of the press.

Up till now, coated steel plates with defined surface roughness, for example, were welded onto the base of the screw shaft for this purpose. So far, this kind of steel plate or plate segment was welded on between the conveying flights on the screw shaft, particularly in the final turns of the transport channel shortly before the outlet port in the so-called high-compression area in which the material to be conveyed is already highly compressed and the greater part of the liquid has been removed. However, the disadvantage here is that the manufacture of such plates, usually with surface coating and where the defined surface roughness values are obtained by means of thermal spraying processes and a subsequent brushing process, is very expensive. Similarly, welding the steel plates with rough surfaces is time-consuming and expensive. Furthermore, it has been shown that the scheduled shutdown times for a screw press are too short to replace welded-on steel plates when they are no longer as rough or their rough surface coating has been abraded. An alternative embodiment according to AT 506 098 is to design the surface in tiers and weld on suitable strips if necessary, which also requires longer shutdown times when they are to be replaced.

In addition, screw presses are known from DE 266 077 that have a shaft coated with enamel, quartzite or similar. In KR 101049965 B1, the screw flight is coated with cobalt or tungsten carbide. DE 44 88 717 A1 describes wear protection elements that are attached to the outer circumference of a screw flight. A friction-increasing film is known from EP 2 848 824 A1 that is disposed between two components to prevent the components from shifting.

SUMMARY OF THE INVENTION

Provided herein is a screw press that avoids the described disadvantages of the state of the art and where the rough-surface lining materials on the screw shaft can be changed quickly and inexpensively.

In one embodiment for use in a generic screw press, a composite material containing hard material particles that are evenly distributed and embedded into a matrix component to form a rough surface is secured to the screw shaft in a material-locked connection in at least one surface section within the transport channel, where the underside of the composite material is glued detachably to the screw shaft by an adhesive layer.

In general, it can be said that materials comprising two or more materials bonded to one another are referred to as compound or composite materials and their material properties are different to those of their individual material components. A composite material suggested by the invention, where the hard material particles are distributed evenly and embedded into a matrix component in such a way that the hard material particles guarantee a rough surface on the composite material, hold the advantage that this material can be produced faster and at lower cost than the surface-coated steel plates currently used. In addition, hard material particles have the advantage of a defined surface roughness and a defined friction coefficient, which remain as constant as possible over the service life of the composite material. The bond between the hard material particles and the matrix component into which they are at least partly embedded is a material-locked or form-locked connection, or a combination of the two.

A matrix component that is softer or more flexible than the hard material particles and which is made, for example, from a plastic that retains its shape, also holds the advantage that the composite material can be adjusted better to the geometrical conditions of the respective surface section of the screw shaft than is the case with coated steel plates. Furthermore, surface sections of the screw shaft covered with such a composite material that is comparatively flexible can be changed faster and more easily due to the lighter weight and greater flexibility or ductility of the composite material.

With a suitable adhesive joint, the underside of the composite material can be secured quickly and inexpensively to a surface section of the screw shaft. In any event, an adhesive joint can be formed cheaper than a welded joint, which was used so far to secure the rough-surface steel plates to the screw shaft. In the context of the present invention, all known adhesive joint variants can be used for this purpose. For example, the layer of adhesive is only applied to the underside of the composite material and this material is positioned with the layer of adhesive facing and pressed onto the appropriate surface section of the screw shaft. As an alternative, the layer of adhesive can be applied to the appropriate surface section of the screw shaft, where the composite material is then placed and pressed onto this adhesive layer. Also disclosed is a contact bonding process, where both adhesive surfaces—both the underside of the composite material and the surface section of the screw shaft to which it is to be glued—are coated with the same adhesive or with different adhesives and the composite material is glued subsequently to the screw shaft.

It is advantageous in a screw press embodiment disclosed herein if the surface roughness of the composite material with which the hard material particles protrude from the matrix component amounts to between 2 and 20 µm, preferably 3 to 10 µm, particularly preferably 5 to 8 µm. The composite material has a defined surface roughness, where the roughness measurements relate to the extent to which the hard material particles protrude from the matrix component into which the particles are embedded.

In another embodiment, the composite material can comprise at least one wear indicator layer that is integrated into the matrix component and/or disposed on the underside of the composite material. It is an advantage if the wear indicator layer, comprising a colored polymer layer with color markings for example, serves to indicate wear on the composite material used.

In another advantageous embodiment, the composite material in a screw press is designed as a composite material mat containing hard material particles distributed evenly and embedded into a matrix component to form a rough surface and also comprises an adhesive layer on the underside of the composite material mat, where the composite material mat is glued detachably to at least one surface sector of the transport channel of the screw shaft. In this particularly easy-to-handle embodiment, the composite material is already prepared in the form of a composite material mat, where an adhesive layer is provided on the underside of the composite material, which can be covered with a protective film, for example. Thus, the composite material mat has a self-adhesive design that enables the composite material mat to be positioned on and glued to a surface section of the screw shaft especially quickly. For example, templates can be made quickly and easily depicting the respective pitch of the screw shaft or the geometry of the respective transport channel and which serve as a template for cutting the appropriate composite material mats exactly to size and positioning them.

In another embodiment, the composite material mat in a screw press can comprise at least one wear indicator layer that is integrated into the matrix component and/or disposed between the matrix component and the adhesive layer. As already mentioned previously, a wear indicator layer, comprising a colored polymer layer with color markings for example, to indicate wear on the composite material used is also an advantage in a composite material mat.

In a screw press, it is specially advantageous if composite material mats with a surface roughness between 2 and 20 µm, preferably 3 to 10 µm, particularly preferably 5 to 8 µm, are glued detachably to the screw shaft, at least to several surface sections of a transport channel. By gluing composite material mats to the screw shaft, the conveying material to be pressed, for example chemical pulp fibers, is prevented from adhering to and rotating together with the surface of the screw shaft and the efficiency of the screw press is increased.

In another embodiment of a screw press, it is expedient if several composite material mats, preferably three or four composite material mats adjacent to one another, are glued detachably to adjacent surface sections of a transport channel of the screw shaft. For easier handling, several composite material mats adjacent to one another are glued onto the screw shaft in the corresponding turns of the transport channel of the conveying flight. In the high-compression area of the screw press, in particular, the composite material mats with defined surface roughness can be glued quickly and easily to the screw shaft in this way. Templates can also be used here if necessary for exact fitting and positioning of the composite material mats.

In a screw press disclosed herein, it is advantageous if the matrix components of the composite material in which the hard material particles are embedded to form a rough surface are made of an elastomer, preferably a thermoplastic elastomer. As a result of the hard material particles being evenly distributed in the softer, elastic matrix component made of elastomer or a thermoplastic elastomer, it is possible to achieve a defined surface roughness of the composite material and composite material mat that is as long-lasting as possible.

The disclosure also relates to the use of a composite material containing hard material particles that are embedded into a matrix component to form a rough surface and provide a material-locked connection to at least one surface section of the screw shaft of a screw press.

If a composite material is used for the material-locked connection to at least one surface section of a screw shaft, it is particularly advantageous if the composite material is glued detachably with an adhesive layer to the at least one surface section of a screw shaft.

It is also expedient in the context of the disclosure if a composite material mat is used containing hard material particles that are embedded into a matrix component to form a rough surface, where the composite material mat still has an adhesive layer on an underside of the composite material mat, provided for detachable gluing to at least one surface section of a screw shaft in a screw press. The use of a self-adhesive composite material mat is especially practical and easy to use. In order to glue on the composite material mat, it is only necessary to remove a protective film, for example, covering the adhesive layer on its underside, and the composite material mat can then be positioned on and glued to a surface section of the screw shaft.

It is advantageous to use a composite material and/or composite material mat if the surface roughness with which the hard material particles protrude from the matrix component is between 2 and 20 µm, preferably 3 to 10 µm, particularly preferably 5 to 8 µm.

It is particularly expedient to use a composite material and/or a composite material mat if at least one wear indicator layer is integrated into the matrix component and/or at least one indicator layer is disposed between the matrix component and the adhesive layer.

However, it is also possible in the context of the disclosure to use a composite material and/or a composite material mat, where the matrix component of the composite material into which the hard material particles are embedded to form a rough surface is made of an elastomer, preferably a thermoplastic elastomer. Due to the lower weight compared to steel plates and the high flexibility of the composite material or composite material mat, composite material with a defined surface roughness can be applied particularly quickly and easily to surface sections of the screw shaft.

BRIEF DESCRIPTION OF THE DRAWINGS

Further details, features and advantages of the invention result from the following explanation of the embodiments illustrated schematically in the drawings. In the drawings.

DETAILED DESCRIPTION

Figure 1:
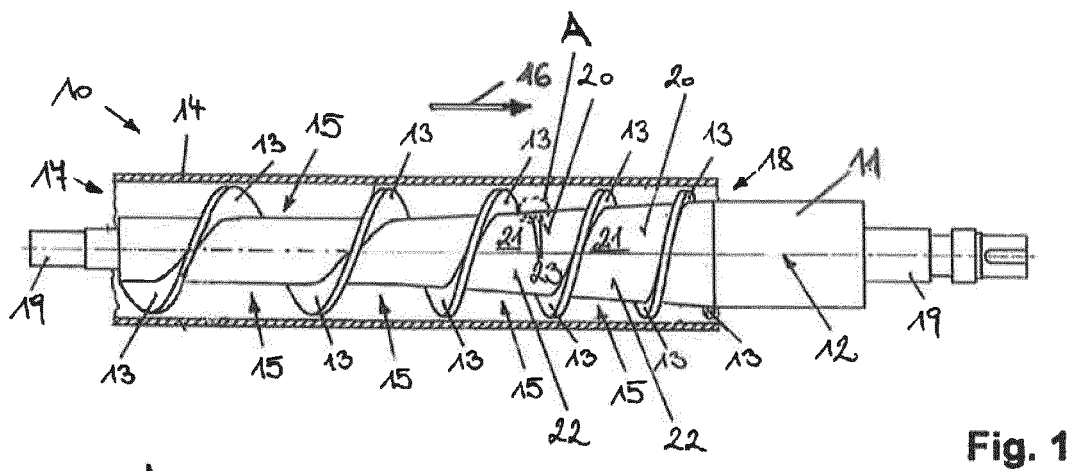
FIG. 1 shows a first embodiment of a screw press in a partial, sectional view from the side.

FIG. 1 shows a screw press 10 according to an embodiment of the invention, which comprises a screw shaft 11 with a screw shaft axis 12, where the screw shaft 11 has a spiral-shaped or helical conveying flight 13 that extends into the interior of an outer housing shell 14. A transport channel 15 is formed between the housing shell 14 and the screw shaft 11 and the conveying flight 13 mounted on it, respectively, through which the conveying material to be pressed is conveyed in a conveying direction 16 from an inlet port 17 in the housing shell 14 to an outlet port 18. By selecting suitable screw shaft 11 geometry that is designed such as to ascend conically in downstream conveying direction 16 towards the outlet port 18, for example, and choosing a suitable pitch for the conveying flight 13, a free cross-sectional area of the transport channel 15 is reduced successively in conveying direction 16.

The screw shaft 11 is supported rotatably in bearings (not shown) around the screw shaft axis 12 with several shaft journals 19 and provided with a drive that is not shown here. As a result of this drive arrangement, the screw shaft 11 can be set in rotation, where the material to be conveyed is directed through the spiral-shaped transport channel 15, which tapers in conveying direction 16, and the material to be conveyed is dewatered there progressively.

In order to carry off the liquid separated from the material to be conveyed, the housing shell 14 has liquid passages that are not shown here and can be slotted or perforated in design, for example. The liquid draining off through the liquid passages is collected in a collecting device provided for this purpose.

In order to prevent the conveying material—fiber or sludge suspensions are mentioned here by way of example—from adhering to the surface of the screw shaft 11 and to reduce the abrasion that materials of this kind cause on the screw shaft 11, respectively, and thus prevent the disadvantages thereof mentioned at the beginning, a composite material 21 with a defined surface roughness 22 is secured in a material-locked connection to at least one surface section 20 of the screw shaft 11 inside the transport channel 15. The composite material 21 comprises hard material particles 23 that are evenly distributed and embedded into a matrix component 24 of the composite material 21 to form a rough surface 22.

Figure 3:
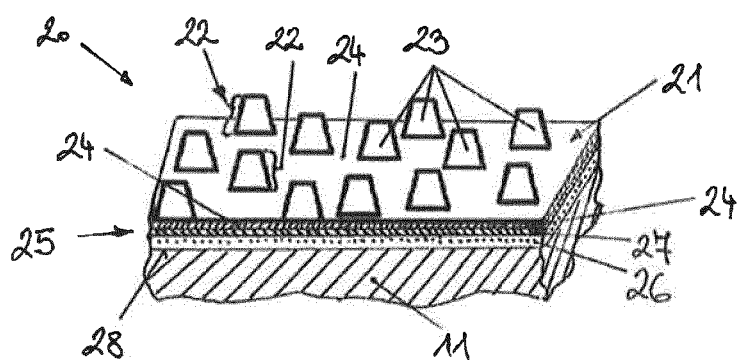
FIG. 3 shows an enlarged view of the detail section A marked in FIGS. 1 and 2 in each case in a partial, sectional view as an isometric representation.

As can be seen in FIG. 3, which illustrates the detail section A marked in FIG. 1 in an enlarged view, the material-locked connection of the composite material 21 is formed here by gluing with an adhesive layer 26 applied to an underside 28 of the composite material 21 or, as an alternative, to the corresponding surface section 20 of the screw shaft 11 before the composite material 21 is pressed onto the adhesive layer 26. Similarly, it is feasible in the context of the invention that adhesive layers 26 of the same adhesive or also of different adhesives obeying the principle of a contact adhesive are applied both to the underside 28 of the composite material 21 and also to the appropriate, corresponding surface section 20 of the screw shaft 11.

As is also shown in the enlarged view in FIG. 3, the hard material particles 23 protrude from the matrix component 24 with a defined surface roughness 22, which can be approximately 5 to 8 µm here for example. The matrix component 24 is made here from a thermoplastic elastomer. The hard material particles 23 are thus embedded advantageously into a comparatively softer, elastic matrix component, thus reducing wear on the hard material particles 23 and extending the service life of the rough-surface composite material 21.

A wear indicator layer 27 is integrated here into the material component 24 as a wear indicator or disposed between the matrix component 24 and the adhesive layer 26. The wear indicator layer 27 comprises a colored polymer layer with a colored marking, for example, that becomes visible when the hard material particles 23 are abraded.

Figure 2:
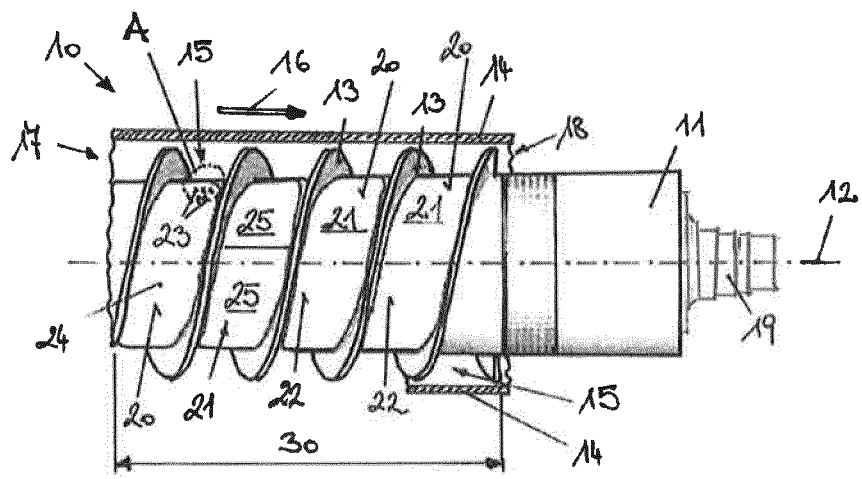
FIG. 2 shows a detail from a second embodiment of a screw press in a partial, sectional view from the side.

FIG. 2 shows another embodiment of a screw press 10 according to the invention, where composite material mats 25 comprising a composite material 21 with a defined surface roughness 22 are glued to surface sections 20 of the screw shaft 11 inside the transport channel 15. In addition, an adhesive layer 26 has already been applied to the underside 28 of the composite material mats 25, thus the composite material mats 25 are self-adhesive and particularly practical for gluing to the screw shaft 11. Furthermore, the adhesive layer 26 is covered with a protective film, for example, that is not shown here and must be pulled off before laying the composite material mats 25.

The several composite material mats 25 are glued adjacent to one another in FIG. 2 to the adjacent surface sections 20 of the screw shaft 11 inside the turns of the transport channel 15, which lie in the high-compression area 30 of the screw press 10, in such a way that they can be detached quickly and easily after a certain service life or depending on the degree of wear and replaced by new composite material mats 25.

In the same way as FIG. 1, the detail section A marked in FIG. 2 is also illustrated in an enlarged view in FIG. 3.

Unlike FIG. 1, where the adhesive layer 26 applied to a composite material 21 must also be applied to the underside 28 of the composite material 21—or directly to the screw shaft 11, the adhesive layer 26 has already been applied to the underside 28 of the composite material mat 25 when a composite material mat 25 is used. Thus, FIG. 3 shows, in principle, both the finished layer structure of a composite material 21 and of a composite material mat 25, both of which are glued on.

The invention claimed is:

1. A screw press (10) for removing liquid from a material to be conveyed, comprising
a screw shaft (11) with a spiral-shaped conveying flight (13) mounted on the screw shaft (11), and
a housing shell (14) surrounding the screw shaft, forming a transport channel (15) for material to be conveyed between the screw shaft (11), the conveying flight (13) and the housing shell (14), wherein
a composite material (21) comprising hard material particles (23) that are evenly distributed and embedded into a matrix component (24) to form a rough surface (22) is secured to the screw shaft (11) in a material-locked connection in at least one surface section (20) within the transport channel (15), an underside (28) of the composite material (21) being glued detachably to the screw shaft (11) by an adhesive layer (28).

2. The screw press (10) according to claim 1, wherein the composite material (21) takes the form of a composite material mat (25) with hard material particles (23) embedded into a matrix component (24) to form a rough surface (22), and comprises an adhesive layer (26) on an underside (28) of the composite material mat (25), wherein the composite material mat (25) is glued detachably to at least one surface section (20) of the screw shaft (11).

3. The screw press (10) according to claim 1, wherein the composite material (21) or the composite material mat (25) from which the hard material particles (23) protrude from the matrix component (24) has a surface roughness (22) of between 2 and 20 μm.

4. The screw press (10) according to claim 3, the composite material (21) or the composite material mat (25) from which the hard material particles (23) protrude from the matrix component (24) has a surface roughness (22) of between 5 and 8 μm.

5. The screw press (10) according to claim 1, wherein the composite material (21) or the composite material mat (25) comprises at least one wear indicator layer (27) that is integrated into the matrix component (24) or disposed on the underside (28) of the composite material (21), or both.

6. The screw press (10) according to claim 2, wherein the composite material (21) or the composite material mat (25) comprises at least one wear indicator layer (27) that is integrated into the matrix component (24) or disposed on the underside (28) of the composite material (21), or both.

7. The screw press (10) according to claim 2, wherein a plurality of composite material mats (25) are positioned adjacent one another and glued detachably to adjacent surface sections (20) of the screw shaft (11) within a transport channel (15).

8. The screw press (10) of claim 7, wherein at least three composite material mats (25) adjacent to one another are glued detachably to adjacent surface sections (20) of the screw shaft (11) within a transport channel (15).

9. The screw press (10) according to claim 1, wherein the matrix component (24) of the composite material (21) into which the hard material particles (23) are embedded to form a rough surface (22) is made of an elastomer.

10. The screw press (10) according to claim 9, wherein the elastomer is a thermoplastic elastomer.

11. The screw press (10) according to claim 2, wherein the matrix component (24) of the composite material (21) into which the hard material particles (23) are embedded to form a rough surface (22) is made of an elastomer.

12. The screw press (10) according to claim 11, wherein the elastomer is a thermoplastic elastomer.

13. The screw press (10) according to claim 5, wherein the matrix component (24) of the composite material (21) into which the hard material particles (23) are embedded to form a rough surface (22) is made of an elastomer.

14. The screw press (10) according to claim 13, wherein the elastomer is a thermoplastic elastomer.

15. A method of using a composite material (21) for a material-locked connection (26), comprising:
providing a composite material (21) with hard material particles (23) distributed evenly and embedded into a matrix component (24) to form a rough surface (22),
providing a screw press (10) having a screw shaft (11) with at least one surface section (20), and
detachably gluing the composite material (21) to the at least one surface section (20) of the screw shaft (11) via an adhesive layer (26).

16. The method of using a composite material (21) of claim 15, wherein the surface roughness (22) from which the hard material particles (23) protrude from the matrix component (24) is between 2 and 20 μm.

17. The method of claim 16, wherein the matrix component (24) is made of a thermoplastic elastomer.

18. A method of using a composite material mat (25) for a material-locked connection (26), comprising:
providing a composite material mat (25) with hard material particles (23) distributed evenly and embedded into a matrix component (24) to form a rough surface (22), the composite material mat (25) including an adhesive layer (26) on an underside (28) thereof,
providing a screw press (10) having a screw shaft (11) with at least one surface section (20),
detachably gluing the composite material mat (25) to the at least one surface section (20) of the screw shaft (11) via the adhesive layer (26), wherein
a wear indicator layer (27) is integrated into the matrix component (24) or at least one wear indicator layer (27) is disposed between the matrix component (24) and the adhesive layer (26), or both.

19. The method of using a composite material mat (25) of claim 18, wherein the surface roughness (22) from which the hard material particles (23) protrude from the matrix component (24) is between 2 and 20 μm.

20. The method of claim 19, wherein the matrix component (24) is made of a thermoplastic elastomer.

* * * * *